Jan. 14, 1969  C. W. ELLIOTT ET AL  3,421,357
AUTOMATIC TRANSFER MECHANISM FOR UPSETTER
Filed Feb. 28, 1966

INVENTORS
Carl W. Elliott &
BY James J. McNeil

E. J. Biskup
ATTORNEY

Jan. 14, 1969 C. W. ELLIOTT ET AL 3,421,357
AUTOMATIC TRANSFER MECHANISM FOR UPSETTER
Filed Feb. 28, 1966 Sheet 2 of 3
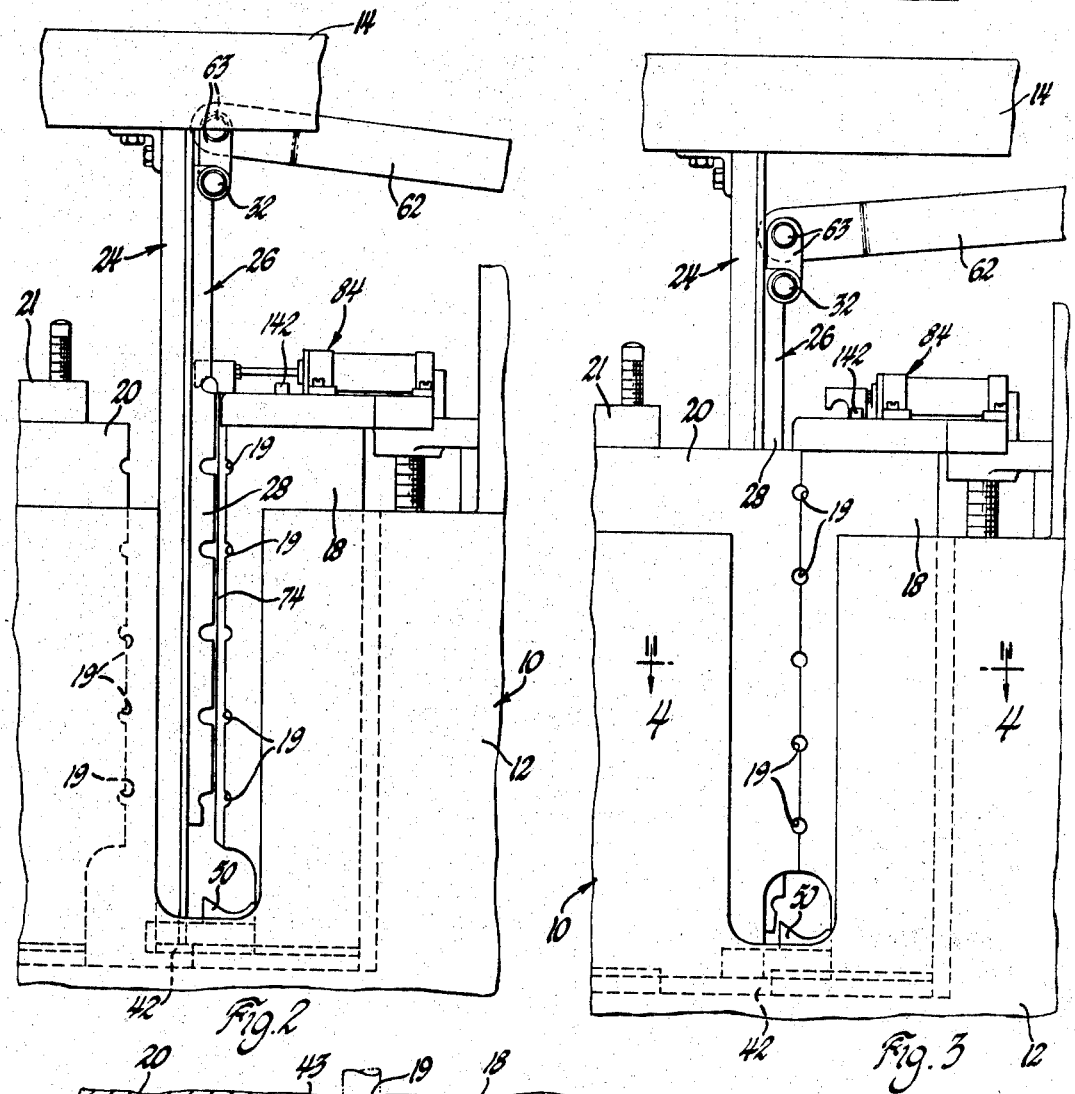
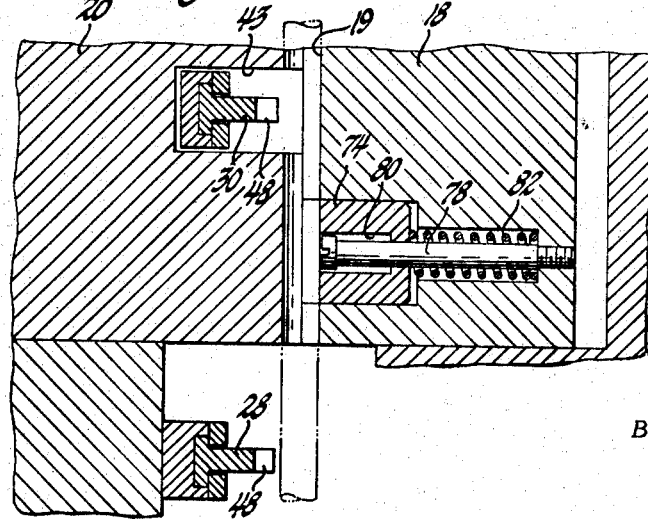
INVENTORS
Carl W. Elliott &
BY James J. McNeil
C. J. Bishup
ATTORNEY INVENTORS
Carl W. Elliott &
BY   James J. McNeil

ATTORNEY

United States Patent Office 3,421,357
Patented Jan. 14, 1969

3,421,357
AUTOMATIC TRANSFER MECHANISM
FOR UPSETTER
Carl Wayne Elliott, Clarence, and James J. McNeil, East Aurora, N.Y., assignors to General Motors Corporation, Detroit, Mich., a corporation of Delaware
Filed Feb. 28, 1966, Ser. No. 530,517
U.S. Cl. 72—405      2 Claims
Int. Cl. B21d 43/00; B21d 45/00

ABSTRACT OF THE DISCLOSURE

A transfer mechanism for progressively advancing a workpiece through a series of work stations and having transfer bar means formed with a plurality of spaced workpiece supports which align with the work stations when the transfer bar means is in a first position and in an advanced second position. An air cylinder feeds the workpiece into one of the workpiece supports while the transfer bar means is in the first position and a cam drive is provided for moving the transfer bar means from the first position to the second position whereat the workpiece is located adjacent a work station. A spring biased pressure bar serves to remove the workpiece from the work station upon completion of the work operation and move it into the next workpiece support of the transfer bar means while the latter is in the first position.

---

Figure 1:
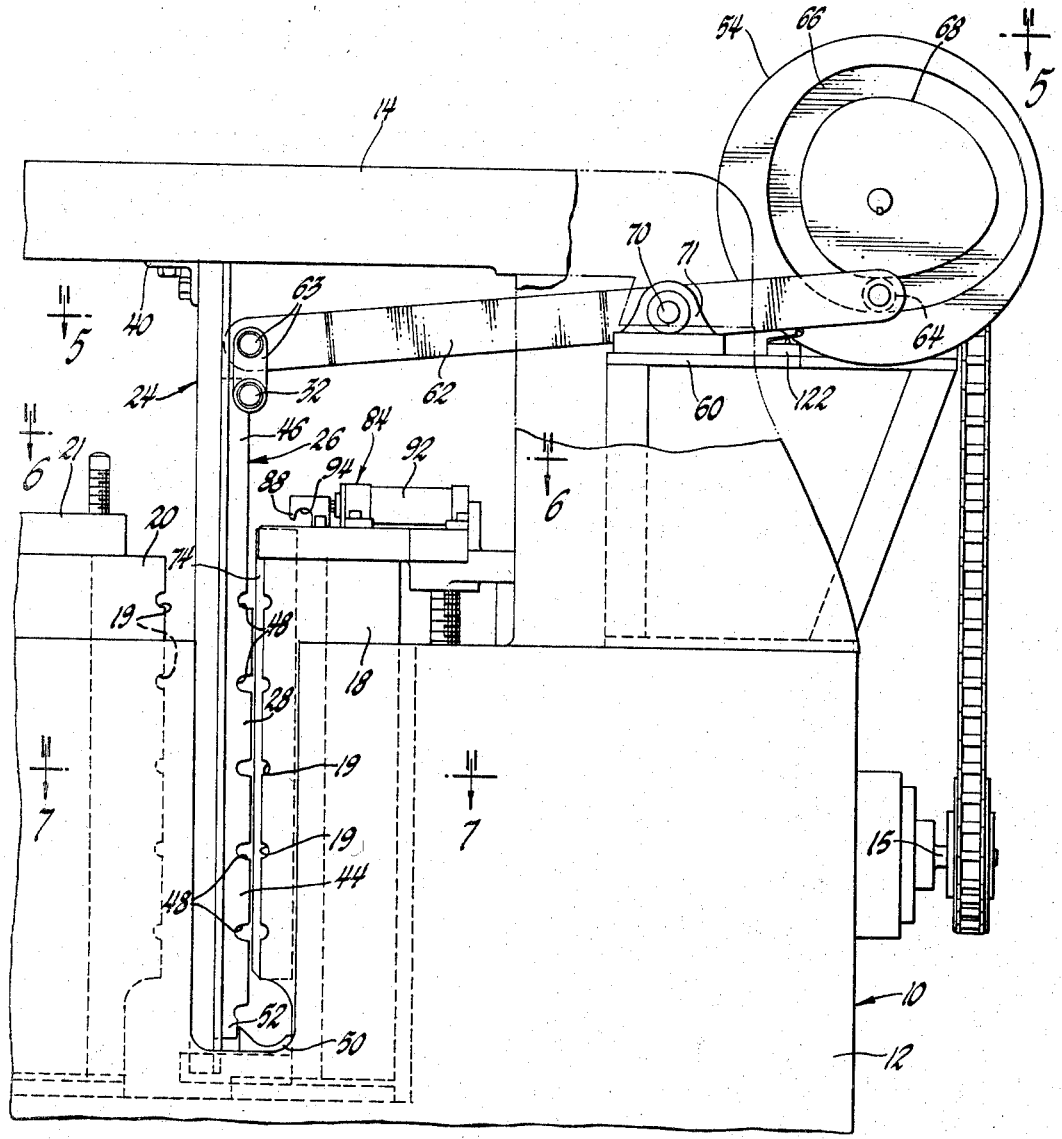

This invention relates to feeding mechanisms and in particular to a transfer mechanism for automatically feeding bar stock through the dies of a multi-pass upsetter.

A forging machine, or upsetter, commonly includes a stationary die, a movable die horizontally opposed to the stationary die which moves against the stationary die to clamp bar stock in suitable die cavities formed within the mating die faces, and a header die which moves in a plane parallel to the parting surface between the clamping dies and performs the major work of forging. Operation of the dies is automatically controlled from the main crankshaft of the forging machine. In normal practice, the operator inserts the bar stock between the clamping dies which then close, clamping the bar in the die cavity. The header die advances to preform the upsetting operation. After the upsetting operation is completed, the header die retracts and the movable die opens to release the bar stock. The operator then moves the bar stock to the next die cavity and the cycle is repeated.

As should be apparent, this procedure is not completely satisfactory since the operator must manually insert the bar stock into each die cavity. Accordingly, this invention contemplates a transfer mechanism for automatically advancing the bar to succeeding die cavities so as to relieve the operator of this chore and, as an added advantage, make possible a substantial increase in the number of workpieces which may be upset or headed in a given time.

According to the preferred form of the invention, the transfer mechanism includes a pair of spaced, parallel transfer bars located in a vertical plane between the clamping dies of the machine and movable in unison between upper and lower dwell positions to horizontally locate the bar stock adjacent the individual die cavities. The transfer arms are actuated by a drive cam which is powered by the main crankshaft of the upsetter and has a cam surface configuration which synchronizes the movement of the transfer bars with the operation of the upsetter dies. Heated bar stock is loaded onto the transfer bars while they are in the upper dwell position. The transfer bars then move to the lower dwell position, forcing the bar stock down between the clamping dies and positioning it adjacent a die cavity. As the movable die closes, the bar stock is removed from the transfer bars by the movable die and inserted in the die cavity of the stationary die. The header advances to perform the supsetting operation and the transfer bars are simultaneously lifted to the upper position. After the forming operation, the dies open and the bar stock is ejected from the die cavity and returned to the transfer bars which are in an upper position. The bar stock is inserted into the next lower die cavity on the next downward stroke of the transfer bars. In this manner, the bar stock is progressively transferred to the several die cavities where progressive upsetting operations are performed.

One of the features of this invention is that it provides transfer mechanism for automatically advancing bar stock through the forming dies of a multi-pass forging machine. Another feature of this invention is the provision of transfer mechanism for the above purpose having a pair of transfer arms which are controllably movable between upper and lower dwell positions to deliver bar stocks to each die cavity.

Yet another feature of this invention is the provision of means for ejecting the bar stock from the die cavity onto the transfer bars after the upsetting operation has been performed and for retaining the bar stock on the transfer arms.

Still another feature resides in the provision of means for synchronizing the operation of the transfer arms with the operation of the upsetter dies.

Figure 8:
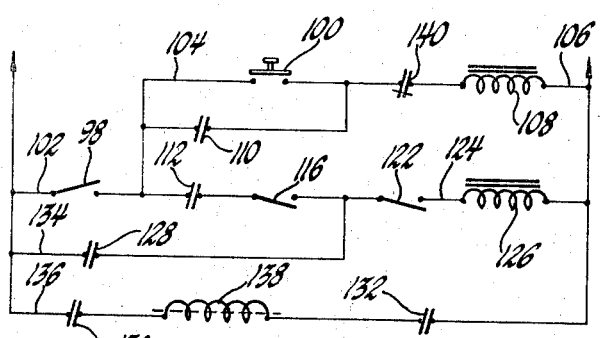
Figure 5:
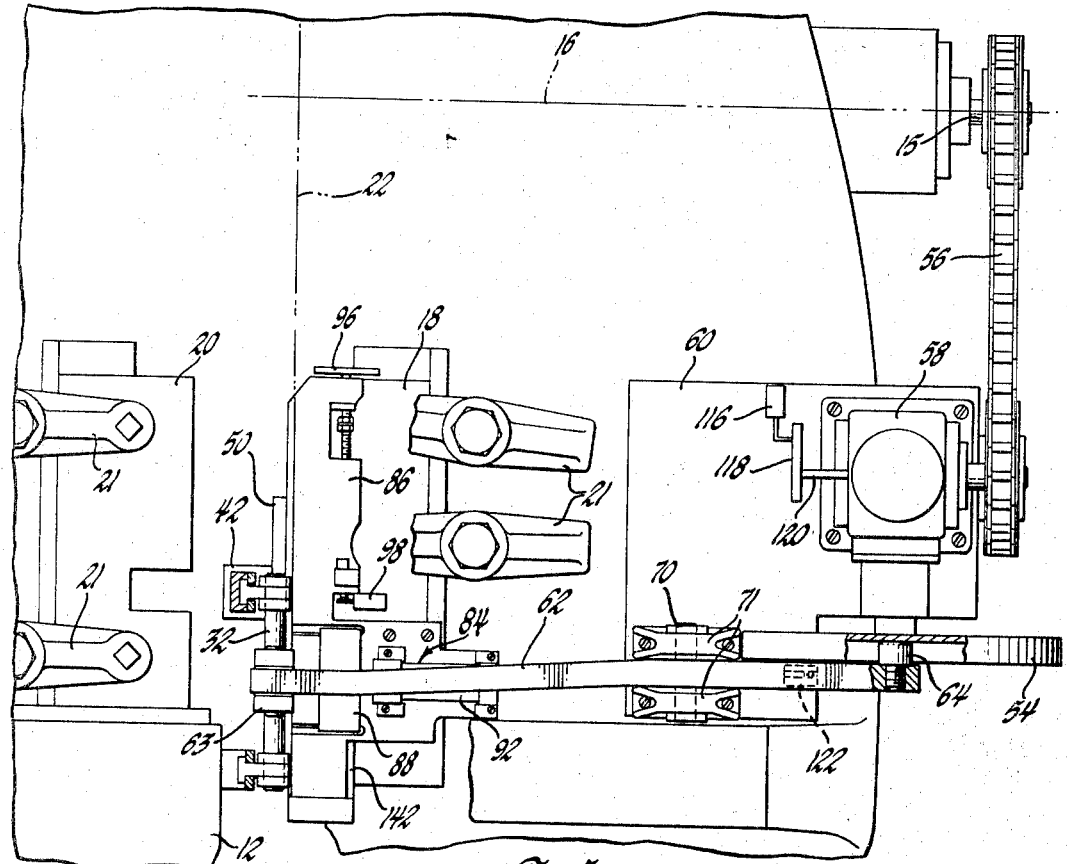
Figures 6, 7:
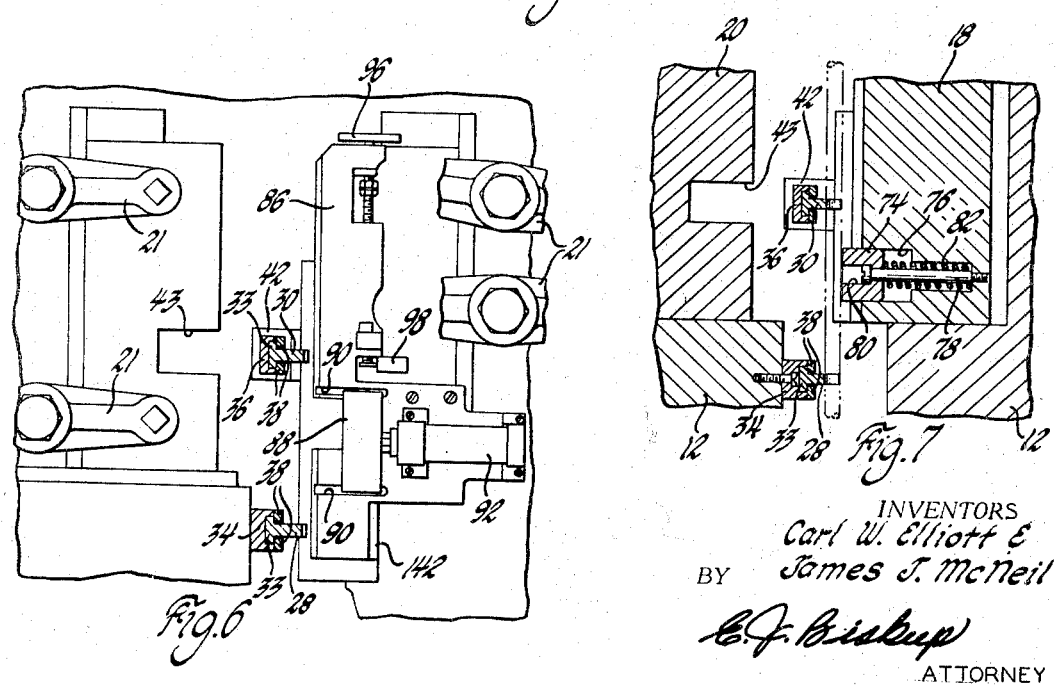

The features as well as the operation of the invention will become apparent to one skilled in the art from a reading of the following description, reference being had to the accompanying drawings wherein:

FIGURE 1 is a front elevational view of a portion of an upsetter embodying the present invention;
FIGURE 2 is a view similar to FIGURE 1 showing the transfer mechanism in another position;
FIGURE 3 is a view similar to FIGURE 1 showing the grip dies in closed position;
FIGURE 4 is an enlarged cross-sectional view taken generally along the line 4—4 of FIGURE 3;
FIGURE 5 is a plan view taken generally along the line 5—5 of FIGURE 1;
FIGURE 6 is a plan view taken generally along the line 6—6 of FIGURE 1;
FIGURE 7 is a cross-sectional view taken generally along the line 7—7 of FIGURE 1; and
FIGURE 8 is a diagrammatic view of the loader control circuit.

Referring to the drawings and in particular to FIGURES 1 and 5, there is shown a conventional upsetter 10 which includes a frame 12, a tie bar 14, and a crankshaft 15 whose center line is indicated at 16. Oppositely disposed dies 18 and 20 are received within recesses in frame 12 and are secured in place by clamps 21. Die 18 is stationary, while the die 20 is movable horizontally into engagement with die 18. Each die has a number of impressions 19 in its exposed face which, when the dies are closed, form a series of registering die cavities wherein bar stock is progressively formed or upset into a desired shape. The dies 18, 20 are termed clamping or gripping dies since they hold the workpiece in place while a tool retaining header die advances in a plane parallel to the parting surface of dies 18, 20 to impact the bar stock and perform the forging operation within the die cavities. Center line 22 indicates the axis along which the the header die moves. The header die is reciprocally operated from the crankshaft 15 and the movable die 20 is operated through a mechanical interconnection with the crankshaft. After a forging pass has been completed, the header die is retracted and die 20 moves to open position shown in FIGURE 1. This cycle is repeated as the workpiece is advanced to each of the several lower die cavities 19. A transfer mechanism 24 according to this invention is provided to automatically feed the workpiece sequentially into each succeeding die cavity starting from the uppermost cavity to the lowermost as seen in FIGURE 1.

The transfer mechanism 24 comprises a tong feed arrangement 26 vertically positioned between the dies 18, 20. The tong feed 26 includes identical, parallel transfer bars 28, 30 which are interconnected at their upper ends by a transfer bar shaft 32 and are movable between upper and lower rest positions. Transfer bars 28, 30 are integrally formed with guides 33 to form T-shaped members movable within guideways 34, 36. The guides 33 are retained within the guideways 34, 36 by retainers 38. The guideway 34 is secured at its upper end to the tie bar 14 by bracket 40 and is bolted at several points along its length to the frame 12. Guideway 36 is similarly attached at its upper end to the tie bar 14 while the lower end is received within a support 42 at the base of the upsetter. The guideway 36 is unsupported along its length since it is positioned between the dies 18, 20. A cut-out 43 in the face of die 20 allows closure upon die 18 without interfering with the guideway 36 and accordingly the transfer arms 28, 30 are movable while die 20 is in the closed position as seen in FIGURE 3. The lower portion 44 of each transfer bar 28, 30, which corresponds roughly to the length of dies 18, 20, is greater in width than the upper portion 46 of each bar and has a series of grooves or notches 48 evenly spaced along its length. Each groove 48 of transfer bar 28 horizontally aligns with a corresponding groove in transfer bar 30 so that a length of bar stock may be horizontally supported across the two bars within the aligned grooves. It will also be observed that the grooves 48 have the same spacing as the impressions 19 in the face of dies 18, 20 so that paired grooves in the bars 28, 30 will align with the die cavities when the transfer bars are in either upper or lower positions. Referring to FIGURE 2, it is seen that the uppermost or first groove 48 is exposed above the top surface of the die 18 when the transfer bars 28, 30 are in the upper position, thus permitting a workpiece to be loaded upon the transfer bars. In this position the second or next lower groove 48 is aligned with the uppermost or first die cavity 19 and each lower groove 48 corresponds to a lower die cavity. Looking again to FIGURE 1, the transfer bars 28, 30 are in the lower position and the first groove 48 is within the dies and opposite the first die cavity. A workpiece, carried in the first groove 48, is thus in position to be inserted into the first die cavity where the first forging operation is performed. Each succeeding groove 48 is aligned with a lower die cavity while the last or bottom groove 48 is outside of the die in position to discharge a workpiece into the discharge cradle 50. The bottom segment 52 of the bars 28, 30 is cut back so that a bar contained in the bottom groove 48 will fall free of the bars when the lower position is reached. The cradle 50 and support 42 may be integrally formed.

The operation of the tong feed 26 is synchronized with the operation of the upsetter dies and is caused to rise and fall through the rotation of a drive cam 54. As best seen in FIGURE 5, the drive cam 54 is driven from the crankshaft 15 of the upsetter through a chain drive and sprocket arrangement 56 and a conventional right angle gear drive 58. The gear drive 58 rests on a support plate 60 suitably secured to the frame 12. A lever arm 62 is pivotally attached at one end to the shaft 32 through a clevis and pin arrangement 63 and has a roller cam 64 at the other end which rides within a cam track 66 in engagement with cam surface 68. Lever arm 62 is pivotally supported along its length by pivot pin 70 which is held by pillow blocks 71. Cam surface 68 is shaped to provide the transfer bars with uniform periods of rise and fall, with equal dwell periods between each. During the rise period, roller cam 64 is forced downward, causing the opposite end of the lever arm and the transfer bars 28, 30 to rise to the upper position. A dwell period then occurs during which time a workpiece may be loaded on the transfer bars 28, 30. The succeeding fall period permits the roller 64 to rise, thus lowering the opposite end of the lever arm 62 and positioning the transfer bars 28, 30 in the lower position. A dwell period following during which time the workpiece is removed from the transfer bars 28, 30 as the die 20 closes.

Each movement of the transfer bars 28, 30 is related to a corresponding die operation. Thus, assuming a workpiece is loaded across the first or top grooves 48 of the transfer bars 28, 30, the latter may be lowered to the lower position while die 20 is open, as shown in FIGURE 1. During the dwell at the lower position, die 20 closes, permitting the top impression 19 in die 20 to remove the workpiece from the transfer bars 28, 30 and insert it in the corresponding impression 19 in stationary die 18. As the forging operation is performed, the transfer bars 28, 30 are raised to the upper position to receive another workpiece in the first groove 48. As the die 20 opens, and before the transfer bars 28, 30 are again lowered, the workpiece formed in the uppermost die cavity will be ejected by means to be described into the second groove 48 of the transfer bars 28, 30. During the next cycle, the first workpiece will be inserted into the second or next lower die impression or cavity 19. Succeeding cycles will, of course, advance the workpiece to the other die cavities.

A spring loaded pressure bar 74, horizontally movable within a vertical groove 76 extending the length of die 18, performs dual functions of ejecting the workpiece from the impressions 19 of die 18 and of supporting the workpiece on the transfer bars 28, 30. As FIGURE 4 shows, the pressure bar 74 is retained within the die 18 by a headed bolt 78 contained within a bore 80 in the pressure bar 74 and threadably received at the rear of the die. A spring 82 forces the pressure bar outwardly so that its outer surface lies in a plane adjacent the grooved surface of transfer bars 28, 30. The pressure bar 74 thus provides a support surface to hold the workpiece within the transfer bar grooves 48 as the bars are being raised or lowered, but is also depressible inwardly as the workpiece is forced into the die 18 by the closing die 20. In FIGURE 4, the pressure bar 74 is shown in the inwardly depressed position while the workpiece, shown in phantom, is held by the dies 18, 20 free of the transfer bars 28, 30. As the die 20 opens, the pressure bar moves to its outer position, forcibly ejecting the workpiece from the die 18 into the adjacent grooves of the transfer bars as described above. The pressure bar 74 is, of course, supported at a number of points along its length in the manner just described.

As shown in the drawings, a loader mechanism 84 is mounted atop the die 18 in position to feed a workpiece into the first groove 48 of the transfer bars 28, 30 while they are in the upper position. The loader 84 includes a support plate 86 fixedly attached to the die 18, a carrier 88 which is slidably movable within slots 90 in the plate 86, and an air cylinder 92 for reciprocally actuating the carrier 88. The cylindrical bar stock is inserted through a transverse slot 94 in the carrier and positioned against a spring loaded actuator plate 96.

During operation, once the bar stock has been inserted in the loader mechanism 84, the carrier 88 is automatically advanced to load the bar stock onto the transfer bars 28, 30 as they reach the upper dwell position. The air cylinder 92 is actuated to advance the carrier 88 by operation of the control circuit of FIGURE 8. In other words, as the bar stock contacts actuator plate 96 limit switch 98 is closed. The operator, when he wishes to feed the bar stock into the transfer mechanism, presses palm button 100 thereby completing a circuit across lines 102, 104, and 106 and energizing relay coil 108. As a result relay contacts 110, 112 close and a holding circuit is established across lines 102, 104 and 106. As the transfer arms 28, 30 rise to the upper dwell position, limit switch 116 is closed by cam 118 which is driven by stub shaft 120 rotating with the right angle drive 58. Cam 118 is timed to close limit switch 116 as the transfer arms 28, 30 reach the upper dwell position. Limit switch 122 is simultaneously closed by lever arm 62 as roller cam 64 reaches the bottom dwell point. Closure of limit switches 116, 122 completes a circuit through lines 102 and 124, energizing relay coil 126 and causing relay contacts 128, 130 and 132 to close. A holding circuit across lines 134, and 124 is thereby completed and a circuit across line 136 is completed to activate solenoid valve 138 which operates to admit air to the air cylinder 92, thus driving the carrier 88 forward as shown in FIGURE 2. When relay coil 126 is energized, normally closed contacts 140 are opened, de-energizing relay 108 and opening contacts 110 and 112. Limit switch 122 remains closed until drive cam 54 rotates through the lower dwell period and lever arm 62 begins to rise. When limit switch 122 is opened relay coil 126 is de-energized, contacts 130 and 132 are opened, solenoid 138 is deactivated, and the air cylinder returns and forces the carrier 88 to retracted position.

As shown in FIGURE 2, the carrier 88 when in the extended position is so situated relative to the transfer bars and the upper or first grooves thereof that the cylindrical bar stock will be positioned in the upper grooves where it is held in place initially by carrier 88 and then by pressure bar 74 as the transfer bars move downward. The feeding mechanism may further include an insert guide 142 to aid in aligning the bar stock with the slot 94.

It will be appreciated that forming operations may be performed simultaneously in each of the die cavities once the transfer bars are fully loaded with workpieces. Thus the work may be turned out with great rapidity as the machine operates.

While a preferred embodiment of the invention has been shown and described, it will be understood that the invention includes any and all modifications falling within the scope of the following claims.

What is claimed is:

1. In a forging machine having a stationary die and a movable die intermittently closable upon said stationary die to form a series of die cavities wherein a workpiece is formed, transfer mechanism for progressively advancing the workpiece to each of the die cavities comprising; a pair of laterally spaced transfer bars movable vertically between upper and lower dwell positions and each including a plurality of spaced workpiece supports which align with said die cavities when said transfer bars are at said upper and lower positions, an air cylinder having a workpiece carrier for feeding said workpiece along a horizontal axis into the uppermost of said workpiece supports while said transfer bars are in the upper position, drive means for moving said transfer bars between said upper and lower positions in synchronization with the operation of said dies, said drive means including a drive cam and mechanical linkage connected to said transfer bars and being adapted to move said transfer bars to the lower position while said dies are open and to the upper position while said dies are closed, said movable die advancing the workpiece from the transfer bars into the adjacent die cavity as said die closes, a spring biased pressure bar for ejecting said workpiece from said stationary die and into the next lower workpiece support of said transfer bars and holding the workpiece therein as said dies open and said support means are in the upper position, said workpiece being repetitively removed from one workpiece support as said dies close and inserted in the adjacent die cavity and ejected from said die cavity into the next lower workpiece support as said dies open, whereby said workpiece is advanced to each of said die cavities and then ejected from said dies.

2. In a multi-pass upsetter having a stationary die and a movable die intermittently closable on said stationary die to form a series of die cavities wherein a workpiece is formed, transfer mechanism for advancing the workpiece to each of the die cavities comprising, workpiece support means located in a vertical plane adjacent said stationary die and including a pair of spaced transfer bars adapted to move in unison between upper and lower dwell positions, each of said bars having a series of longitudinally spaced grooves therein which horizontally align with the grooves in said other bar to form a series of workpiece supports, said workpiece supports aligning with said die cavities at both said lower and upper transfer bar dwell positions so that said workpiece can be transferred between said transfer bars and said die cavities, the uppermost of said workpiece supports being located out of said dies when said transfer bars are in the upper position, an air cylinder having a workpiece carrier for inserting the workpiece into said uppermost support along a horizontal axis when said transfer bars are in the upper position, drive means for moving said transfer bars between said upper and lower positions in synchronization with the operation of said dies, said drive means including a drive cam, a lever interconnecting said drive cam and said transfer bars, one end of said lever arm being connected to said transfer bar by a clevis and pin and the other end of said lever arm having a roller cam supported thereon and driven by said drive cam, said transfer bars being located in said lower position prior to closing of said dies so that the workpiece is removed from said bars by said movable die upon closing and inserted in the adjacent die cavity, said transfer bars being raised to the upper position while said dies are closed so that the next lower workpiece support is located adjacent said die cavity in position to receive the workpiece, a spring biased pressure bar for ejecting the workpiece from said die cavity into said next lower workpiece support as said movable die opens, said pressure bar being received within a vertical groove in the stationary die and horizontally movable therein between inner and outer positions, said pressure bar being forced to the inner position as the movable die closes and inserts the workpiece in a die cavity and advancing to the outer position as the movable die opens thereby forcing the workpiece outwardly with the movable die as it opens until the workpiece recontacts the transfer arms, the workpiece being advanced into position adjacent the next lower die cavity by the next downward movement of said transfer bars.

References Cited

UNITED STATES PATENTS

| 1,916,608 | 7/1933 | Ehinger | 72—421 X |
| 2,609,777 | 9/1952 | Maniaci | 72—427 |
| 2,796,616 | 6/1957 | Leinweber | 10—12 |
| 2,835,152 | 5/1958 | Lamprecht | 72—405 |
| 3,007,181 | 11/1961 | Felber | 10—12 |
| 3,079,823 | 3/1963 | Ekstrom | 72—427 X |

CHARLES W. LANHAM, *Primary Examiner.*

E. SUTTON, *Assistant Examiner.*

U.S. Cl. X.R.

72—419, 427